(12) United States Patent
Liu et al.

(10) Patent No.: US 12,731,607 B1
(45) Date of Patent: Sep. 8, 2026

(54) ACTUATOR MATERIALS AND DESIGNS FOR HARD DISK DRIVES

(71) Applicant: SEAGATE TECHNOLOGY LLC, Fremont, CA (US)

(72) Inventors: Xiong Liu, Singapore (SG); Barish Chakravarty, Singapore (SG); Li Hong Zhang, Singapore (SG); Than Zaw Myint, Singapore (SG); YiChao Ma, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 19/240,295

(22) Filed: Jun. 17, 2025

(51) Int. Cl.
*G11B 5/48* (2006.01)
*G11B 5/55* (2006.01)

(52) U.S. Cl.
CPC ............ *G11B 5/484* (2013.01); *G11B 5/5521* (2013.01)

(58) Field of Classification Search
None
See application file for complete search history.

(56) References Cited

U.S. PATENT DOCUMENTS 5,095,396 A 3/1992 Putnam et al.
5,475,549 A 12/1995 Marder et al.
6,042,658 A * 3/2000 Grensing et al. ...... G11B 5/484 360/265.7
6,813,120 B1 11/2004 Misso
11,017,819 B1 5/2021 Coffey et al.

FOREIGN PATENT DOCUMENTS

JP 58161102 A * 9/1983 ............... G11B 3/10
WO WO-9607181 A1 * 3/1996 ............. G11B 21/16

* cited by examiner

*Primary Examiner* — Craig A. Renner
(74) *Attorney, Agent, or Firm* — Faegre Drinker Biddle & Reath LLP

(57) ABSTRACT

An apparatus includes an E-block. The E-block includes a body portion and one or more arms extending from the body portion. At least one of (1) the body portion, or (2) at least one of the one or more arms, comprises a magnesium-lithium alloy material. In embodiments, the body portion and the one or more arms are integrally formed.

20 Claims, 2 Drawing Sheets

ACTUATOR MATERIALS AND DESIGNS FOR HARD DISK DRIVES

SUMMARY

In certain embodiments, an apparatus includes an E-block. The E-block includes a body portion and one or more arms extending from the body portion. A least one of (1) the body portion, or (2) at least one of the one or more arms, comprises a magnesium-lithium alloy material.

In certain embodiments, the body portion and the at least one or more arms are integrally formed.

In certain embodiments, the magnesium-lithium alloy material comprises a plurality of constituents, each in an amount defined by a constituent weight %, including an amount of the magnesium defined by a first weight % and an amount of the lithium defined by a second weight %, and wherein the first weight % of the magnesium is a greatest constituent weight %, and the second weight % of lithium is a second-greatest constituent weight %.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
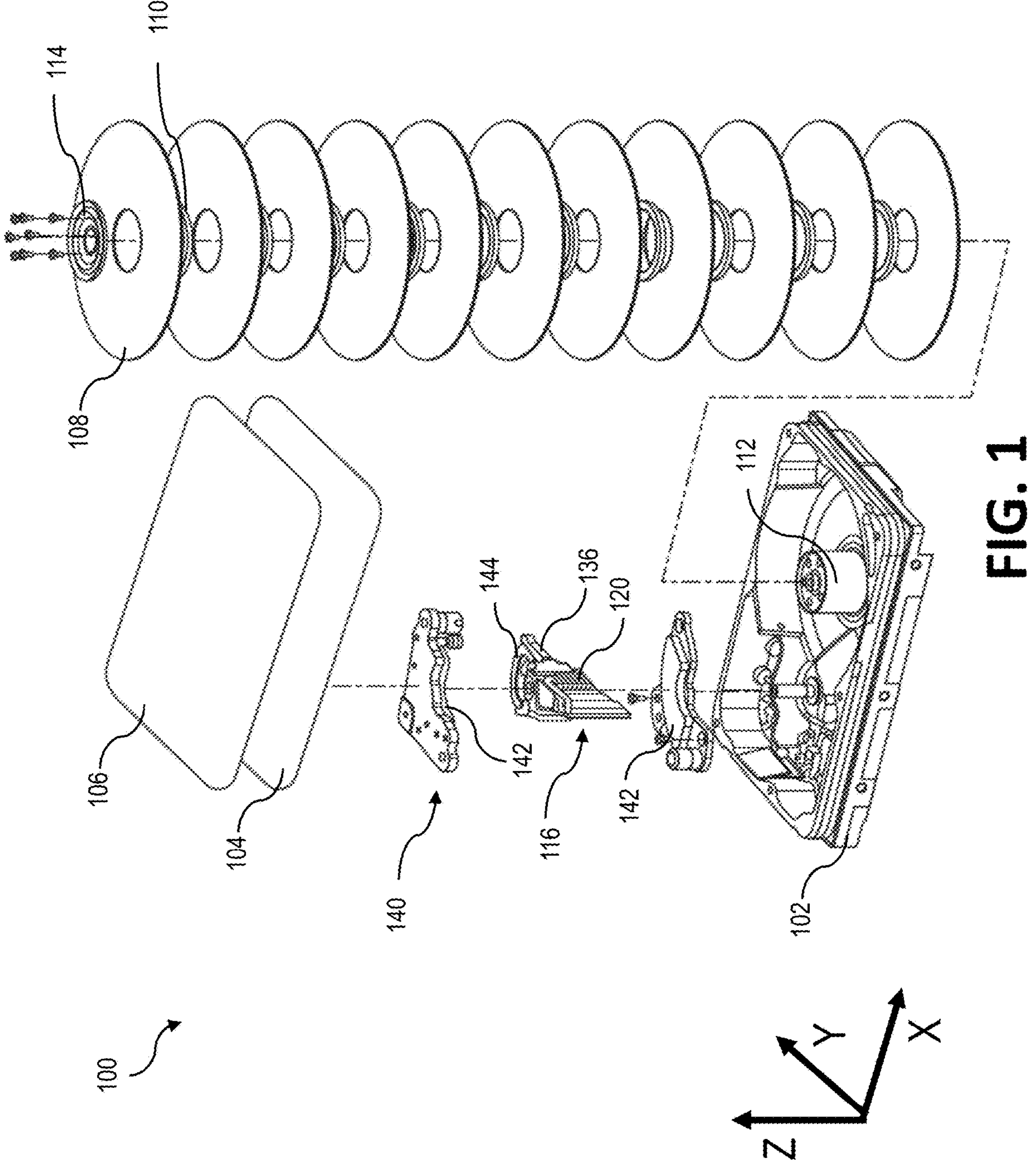
FIG. 1 shows a perspective exploded view of a hard disk drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Hard disk drives utilize rotating disks with magnetic layers to store data. Historically, hard disk drives have used a motor-driven actuator assembly (e.g., a voice coil motor assembly) to move read/write heads to a desired location with respect to the disks to record or access data. The actuator assembly includes one or more arms, and often a plurality of the arms, from which the read/write heads are supported in a cantilevered manner over the rotating disks. The arms may be members of a component referred to as an E-block that includes a body from which the one or more arms extend. The E-block may also include a member, sometimes referred to as a shelf, that portions of the motor are mounted to. E-blocks including at least the body and arms are sometimes manufactured as an integral component (e.g., from a single piece of metal such as aluminum alloy). E-blocks including the body, arms and shelf can also be manufactured as an integral component.

During operation of the disk drive, the arms and other portions of the E-block are rotated in reciprocal directions (e.g., back and forth) at high rates of speed. During this rotation, the arms may vibrate or resonate, for example, by twisting and/or other bending. These vibrations and resonances are undesirable because they can introduce non-repeatable runout (NRRO), which is a displacement or error between the desired and actual locations of the read/write heads with respect to the rotating disks. NRRO may limit the speed at which the arms can be rotated or the accuracy of the data recording or access. One approach for reducing the vibration and resonance of the arms is to attach members known as dampers to the arms. The dampers can be attached, for example, by adhesive such as acrylate adhesive. While this approach can reduce the amount of vibration and resonance of the arms during operation of the hard disk drive, it may have or introduce other undesirable effects. For example, there are costs associated with the manufacture of the dampers and their assembly onto the arms. The adhesives used to attach the dampers to the arms may outgas and release undesirable substances into the hard disk drive.

Certain embodiments of the present disclosure are directed to components such as arms and E-blocks for use in actuator assemblies of hard disk drives. Non-limiting examples include E-blocks or components thereof formed from magnesium-lithium alloy material. Arms and E-blocks of these types can provide advantages in the hard disk drives into which they are incorporated. For example, they can reduce or eliminate the need for dampers on the arms.

FIG. 1 shows an exploded view of a hard disk drive 100 which can include a base deck 102 (sometimes referred to as a baseplate), a process cover 104, and a top cover 106. The process cover 104 can be coupled to the base deck 102 to create an internal cavity that houses data storage components like magnetic recording media 108 (eleven of which are shown in FIG. 1 and which are sometimes referred to herein as disks), disk spacers 110 (ten of which are shown in FIG. 1) positioned between adjacent magnetic recording media 108, a spindle motor 112, a disk clamp 114, and an actuator assembly 116. Although eleven individual disks are shown in FIG. 1, the hard disk drive 100 could include a different number of disks. As an example, the hard disk drive 100 could include ten disks or twelve disks.

During assembly, the process cover 104 can be coupled to the base deck 102 by removable fasteners to seal a target gas (e.g., air with nitrogen and oxygen and/or a lower-density gas like helium) within the internal cavity. Once the process cover 104 is coupled to the base deck 102, a target gas may be injected into the internal cavity through an aperture in the process cover 104. Injecting the target gas, such as a combination of oxygen and a low-density gas like helium, may involve first evacuating existing gas from the internal cavity and then injecting the target gas from a low-density gas supply reservoir into the internal cavity.

Once the process cover 104 is sealed and the target gas injected, the hard disk drive 100 can be subjected to a variety of processes and tests. Example processes and tests include those that establish performance parameters of the hard disk drive 100 (e.g., fly-height parameters), that identify and map flaws on the magnetic recording media, that write servo and data patterns on the magnetic recording media, and that determine whether the hard disk drive 100 is suitable for commercial sale. Once the hard disk drive 100 has passed certain processes and tests, the base deck 102 and the top cover 106 can be coupled together by welding. In embodiments where air—instead of helium—is the target gas, the hard disk drive 100 may only have a top cover and it may be coupled to the base deck with fasteners and a sealing gasket.

Figure 2:
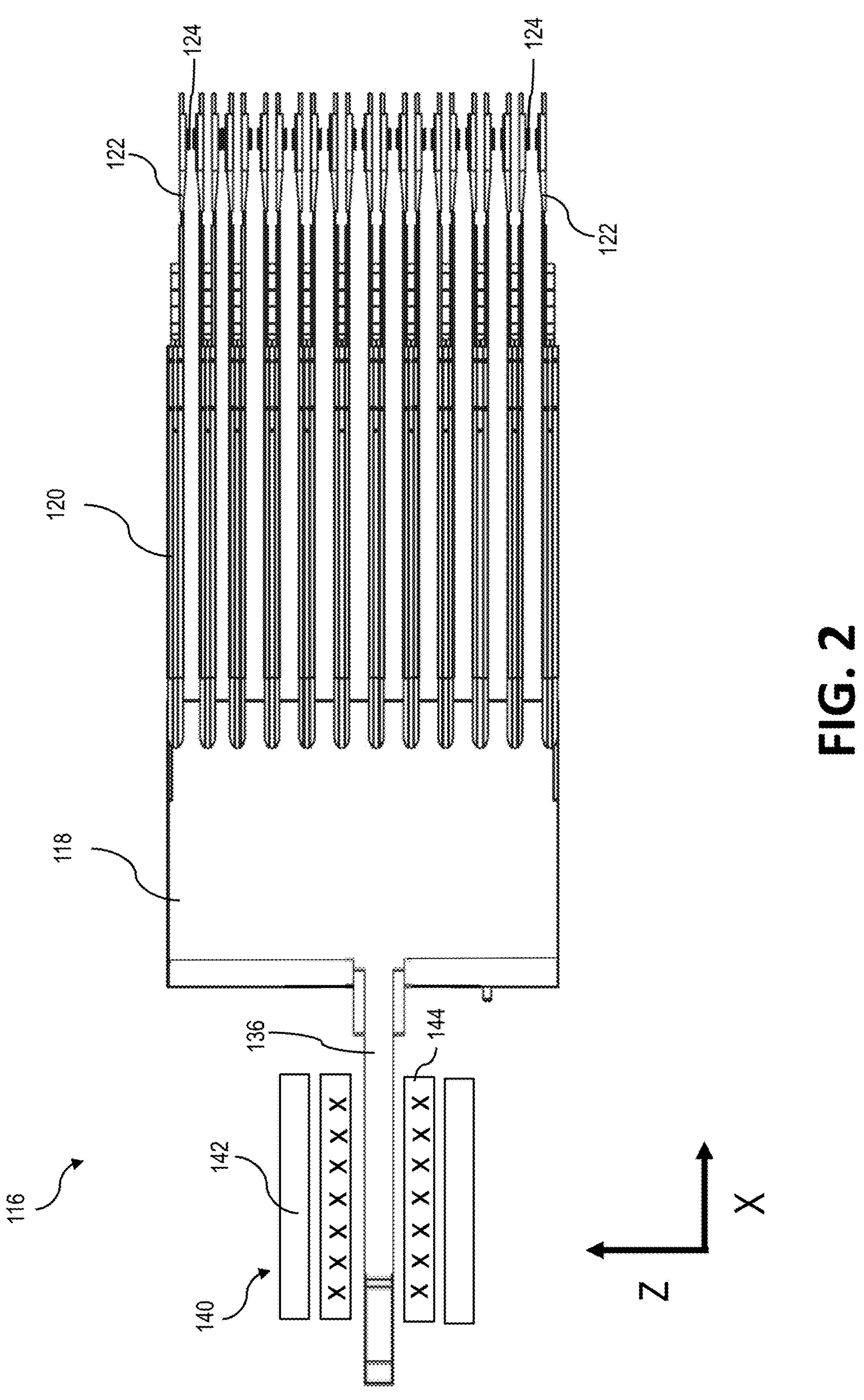
FIG. 2 shows a side view of certain components of the hard disk drive of FIG. 1, in accordance with certain embodiments of the present disclosure.

FIG. 2 shows a side view of the actuator assembly 116 and portions of a voice coil motor 140. The actuator assembly 116 includes a body 118 and one or more arms 120 that extend from the body 118 like cantilevers. Because of its shape, the body 118 and arms 120 of the actuator assembly 116 are sometimes referred to as an "E-block." In embodiments, the body 118 and the arms 120 can be formed from the same metal, including from the same piece of metal (e.g., by casting and/or machining), such that the body 118 and the arms 120 are not separate parts assembled to each other but are instead integral. In other embodiments, one or more of the arms 120 are formed separately from the body 118 and are attached to the body.

The illustrated embodiments of the actuator assembly 116 are shown with twelve arms 120 for purposes of example and can accommodate eleven disks. As such, if more disks or fewer disks than eleven disks are used, the number of arms 120 can be increased or decreased as needed. A suspension 122 is mounted to and extends from a distal end of each of the arms 120. A read/write head 124 is mounted to a distal end of each suspension 122. Read/write heads 124 can include any conventional or otherwise known type of read/write head, such as for example technologies that include heat-assisted magnetic recording (HAMR).

Referring to FIGS. 1 and 2, the hard disk drive 100 includes a voice coil motor 140 including one or more magnets 142 (e.g., two permanent magnets are shown for purposes of example), and a coil 144 (e.g., a conductive coil including a plurality of turns of wire). Actuator assembly 116 includes a shelf 136 that is shaped to receive and secure the coil 144. As shown, the one or more magnets 142 are operatively located adjacent to the coil 144. During operation of the hard disk drive 100, when electric current flows through the coil 144, it interacts with a magnetic field generated by the one or more magnets 142 and produces a force that moves the coil. This controlled interaction among the magnetic fields helps rotate the actuator assembly 116 to position the read/write heads 124 over a desired part of the magnetic recording media 108.

In embodiments, the shelf 136 can be formed from the same metal as the body 118 of the actuator assembly 116, including from the same piece of metal (e.g., by casting and/or machining), such that the shelf 136 and the body 118 are not separate parts assembled to each other but are instead integral. In some embodiments, the body 118, arms 120 and shelf 136 are integral. In other embodiments, the shelf 136 is formed separately from the body 118, and is attached to the body.

Actuator assembly 116 is formed from or includes magnesium-lithium (Mg-Li) alloy material in embodiments. For example, in embodiments where one or more of the body 118, one or more of the arms 120, and/or the shelf 136 are formed separately from each other and assembled together, any or all of the body 118, the one or more arms 120, and/or the shelf 136 can be formed from the magnesium-lithium alloy material. In other embodiments, the one or more arms 120 are formed integrally with the body 118 from the magnesium-lithium alloy material. In yet other embodiments, the shelf 136 is formed integrally with the body 118 from the magnesium-lithium material. In still other embodiments, the body 118, the one or more arms 120, and the shelf 136 are formed integrally. Manufacturing processes, such as for example casting and/or machining, suitable for use with the magnesium-lithium alloy material, can be used to form the actuator assembly 116. In some embodiments, the portions or components of the actuator assembly 116 formed from the magnesium-lithium alloy material (e.g., the body 118, one or more arms 120, and/or the shelf 136) consist essentially of the magnesium-lithium alloy material. For example, in embodiments with the material forming the body 118, one or more arms 120 and/or the shelf 136 does not include other metals or metal alloys.

Magnesium-lithium alloy materials can, for example, be used in embodiments of the actuator assembly 116. Examples of such magnesium-lithium alloy materials include LAZ931, LAZ 933, LZ91 or LA141.

Compositions of certain examples of the magnesium-lithium alloy material LAZ931 can include constituents in the amounts by weight % listed in Table 1 below and have a density of about 1.51 g·cm$^3$ and an elastic modulus of about 43 GPa. Embodiments of LAZ931 have a yield strength of about 145 MPa.

TABLE 1

| Constituent | Amount [weight %] |
|---|---|
| Li (lithium) | 8.0-10.0 (e.g., about 9) |
| Al (aluminum) | 2.5-3.8 (e.g., about 3) |
| Zn (zinc) | 0.5-1.5 (e.g., about 1) |
| Mn (manganese) | ≤0.05 |
| Si (silicon) | ≤0.05 |
| Fe (iron) | ≤0.01 |
| Cu (copper) | ≤0.05 |
| Ni (nickel) | ≤0.005 |
| Mg (magnesium), and usual impurities | Balance |

Compositions of certain examples of the magnesium-lithium alloy material LAZ933 can include constituents in the amounts by weight % listed in Table 2 below and have a density of about 1.53 g/cm$^3$, and an elastic modulus of about 43 GPa. Embodiments of LAZ933 have a yield strength of about 155 MPa. Because, at least in part, LAZ931 has a lower density than the density of LAZ933, in at least some applications, LAZ931 may be more suitable as a material for the applications described herein than LAZ933.

TABLE 2

| Constituent | Amount [weight %] |
|---|---|
| Li (lithium) | 8.5-10.3 |
| Al (aluminum) | 2.5-3.5 |
| Zn (zinc) | 2.5-3.5 |
| Mn (manganese) | ≤0.05 |
| Si (silicon) | ≤0.05 |
| Fe (iron) | ≤0.01 |
| Cu (copper) | ≤0.05 |
| Ni (nickel) | ≤0.005 |
| Mg (magnesium), and usual impurities | Balance |

Compositions of certain examples of the magnesium-lithium alloy material LA141 can include constituents in the amounts by weight % listed in Table 3 below and have a density of about 1.35 g/cm$^3$, and an elastic modulus of about 43 GPa.

TABLE 3

| Constituent | Amount [weight %] |
|---|---|
| Li (lithium) | 13.0-15.0 |
| Al (aluminum) | 0.75-1.5 |
| Mn (manganese) | ≤0.15 |
| Si (silicon) | ≤0.1 |
| Fe (iron) | ≤0.1 |
| Cu (copper) | ≤0.1 |

TABLE 3-continued

| Constituent | Amount [weight %] |
|---|---|
| Ni (nickel) | ≤0.005 |
| Mg (magnesium), and usual impurities | Balance |

Compositions of certain examples of magnesium-lithium alloy material LZ91 can include constituents in the amounts by weight % listed in Table 4 below and have a density of about 1.48 g/cm$^3$, and an elastic modulus of about 45 GPa.

TABLE 4

| Constituent | Amount [weight %] |
|---|---|
| Li (lithium) | 8.5-9.5 |
| Al (aluminum) | 0.5-1.5 |
| Mn (manganese) | ≤0.05 |
| Si (silicon) | ≤0.05 |
| Fe (iron) | ≤0.01 |
| Cu (copper) | ≤0.05 |
| Ni (nickel) | ≤0.005 |
| Mg (magnesium), and usual impurities | Balance |

Examples of the magnesium-lithium alloy material comprise a plurality of constituents, including an amount of magnesium defined by a first weight %, and an amount of lithium defined by a second weight %. In these embodiments, the first weight % of magnesium is a greatest weight %, and the second weight % of lithium is a second-greatest weight %, for example, less than or equal to the first weight % of magnesium. In embodiments, for example, the second weight % of lithium may be equal to or between 6.0-17.0 weight %, such as for example equal to or between 7.0-11.0 weight %, or equal to or between 8.0-10.0 weight %, or equal to or between 7.5-11.3 weight %, or equal to or between 8.5-10.3 weight percent, or equal to or between 12.0-16.0 weight percent, or equal to or between 13.0-15.0 weight %. Other examples of the magnesium-lithium alloy may have lesser or greater amounts of lithium.

Examples of the magnesium-lithium alloy material include an amount of aluminum defined by a third weight %. In these embodiments the third weight % of aluminum may be a third-greatest weight %, for example, less than or equal to the second weight % of lithium. In embodiments, for example, the third weight % of aluminum may be equal to or between 0.25-5.8 weight %, such as for example 1.5-4.8 weight %, or equal to or between 2.5-3.8 weight %, or equal to or between 1.5-4.5 weight %, or equal to or between 2.5-3.5 weight %, or equal to or between 0.5-2.5 weight %, or equal to or between 0.75-1.5 weight %. Other examples of the magnesium-lithium alloy may have lesser or greater amounts of aluminum.

Examples of the magnesium-lithium alloy material include an amount of zinc defined by a fourth weight %. In these embodiments the fourth weight % of zinc may be a fourth-greatest weight %, for example, less than or equal to the third weight % of aluminum. In embodiments, for example, the fourth weight percent to zinc may be equal to or between about 0.1-3.5 weight %, such as for example, equal to or between 0.25-2.5 weight %, or equal to or between 0.5-1.5 weight %, or equal to or between 1.5-4.5 weight %, or equal to or between 2.5-3.5 weight %. Other examples of the magnesium-lithium alloy may have lesser or greater amounts of zinc. For example, some examples of the magnesium-lithium alloy include no added zinc (e.g., other than usual impurity amounts).

Examples of the magnesium-lithium alloy material include one or more other constituents (e.g., added constituents in amounts defined by a weight % that are greater than usual impurity amounts). Examples of such other constituents include manganese, silicon, iron, copper, or nickel.

Examples of the magnesium-lithium alloy material have densities equal to or less than 1.75 g/cm$^3$. In embodiments, for example, the density of the magnesium-lithium alloy material can be equal to or between 1.30-1.70 g/cm$^3$, such as for example equal to or between 1.35-1.65 g/cm$^3$, or less than or equal to 1.55 g/cm$^3$, or less than or equal to 1.45 g/cm$^3$, or less than or equal to 1.35 g/cm$^3$.

Examples of the magnesium-lithium alloy material have elastic moduli equal to or less than 47 GPa, such as for example equal to or less than 45 GPa, or equal to or less than 43 GPa.

Actuator assembly 116 including a body such as 118, one or more arms 120, or one or more shelfs 136, and E-blocks including one or more of the arms and/or one of more of the shelfs integrally formed with the body, offer important advantages when incorporated into a hard disk drive 100. For example, one or more of the arms 120 can be free of a damper (e.g., have no damper). In the embodiments shown in FIG. 2, for example, none of the arms 120 has a damper (e.g., all of the arms are free from a damper). Because of properties—including the stiffness of the magnesium-lithium alloy (e.g., as defined by its elastic modulus)—suitable vibration or resonance-related performance characteristics of the actuator assembly 116 such as NRRO can be achieved without the inclusion of or reduced numbers of dampers. In addition to the enhanced vibration and resonance-related performance characteristics, costs associated with the dampers, including both material and manufacturing costs, can be reduced or even eliminated. And because the need for adhesive or other materials for attaching or coupling the dampers to the arms 120 is reduced or even eliminated, detrimental effects of those materials, such as outgassing, can also be reduced or eliminated. Damping ratios can, for example, be increased by around ten times (e.g., 10X) by the use of magnesium-lithium alloy materials as described herein.

Because of properties including the density of the magnesium-lithium alloy material, a mass of the actuator assembly 116 formed from the magnesium-lithium alloy material having dimensions (e.g., a size) similar to that of actuator assemblies such as those formed from aluminum alloys (e.g., Al6061-T6) or other materials, will be less than the mass of the conventional actuator assemblies (e.g., by up to 47% or even more). Less power is therefore needed by the voice coil motor 140 to drive the magnesium-lithium alloy actuator assembly than the similarly sized conventional actuator assemblies. Additionally, or alternatively, an actuator assembly 116 including the magnesium-lithium alloy that is similarly sized to a conventional actuator assembly may be driven at greater speeds. The lower density of the magnesium-lithium materials can result in increased servo bandwidths of the hard disk drive 100.

Advantages of these types can also be manifested in other design criteria of the actuator assembly 116 and/or other components of the hard disk drive 100 such as the voice coil motor 140. For example, the voice coil motor 140 can include a reduced number of the coils 144 to provide speed or other performance-related characteristics of the actuator assembly 116. For example, the number of turns of the coil may be between 100 and 300. As an example, in connection with a conventional hard disk drive that has, for example a coil with 206 turns, a hard disk drive 100 including E-block components of the type described herein and a voice coil motor 140 with a coil having 181 turns may provide similar performance-related characteristics. In embodiments, for example, if the coil is formed of wire using the same size, a mass reduction of the coil in a hard disk drive including E-block components of the type described herein can generally balance a mass reduction of the E-block components.

A reduction in the number of coils 144 included in the voice coil motor 140 can also provide opportunities to locate one or more of the magnets 142 closer to the shelf 136 in embodiments of the hard disk drive 100. For example, in connection with a conventional hard disk drive with a voice coil motor that has a gap between the top and bottom magnets of about 3.475 mm and a coil height of about 3.175 mm, a gap between the magnets and coil may be about 0.15 mm. In an example of this type, if the coil height is reduced by 2.794 mm, the gap between the top and bottom magnets may become about 3.094 mm. In embodiments, for example, the voice coil motor includes one or more magnets positioned above or below the shelf by a distance less than or equal to 0.1 mm.

This disclosure is not meant to be read in a restrictive manner. For example, the terminology used in the application should be read broadly in the context of the meaning those in the field would attribute such terminology.

Persons skilled in the art will readily appreciate that various aspects of the present disclosure can be realized by any number of methods and apparatus configured to perform the intended functions. Stated differently, other methods and apparatus can be incorporated herein to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

Certain relative terminology is used to indicate the relative position of components and features. For example, words such as “top”, “bottom”, “upper,” “lower,” “left,” “right,” “horizontal,” “vertical,” “upward,” “downward,” “distal,” “proximal,” “leading” and “trailing” are used in a relational sense (e.g., how components or features are positioned relative to one another) and not in an absolute sense unless context dictates otherwise. Similarly, throughout this disclosure, where a process or method is shown or described, the method may be performed in any order or simultaneously, unless it is clear from the context that the method depends on certain actions being performed first.

With respect to terminology of inexactitude, the terms “about” and “approximately” may be used, in certain instances, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms “about” and “approximately” can be understood to mean plus or minus 10% of the stated value.

A structure that “consists essentially of” a material, and similar terms, means that material with no other intentionally added elements or materials, but possibly including usual impurities and/or byproducts of associated manufacturing processes. The term “substantially” may be used, in certain instances, to refer to an objective, result or outcome that includes the stated objective, result or outcome, and that also includes objectives, results or outcomes that are reasonably close to the stated objective, result or outcome. Objectives, results or outcomes that are reasonably close to the stated objective, result or outcome may deviate from the stated objective, result or outcome by a reasonably small amount as understood and readily ascertained by individuals having ordinary skill in the relevant arts.

As used herein, “couple” means join, connect, attach, adhere, affix, or bond, whether directly or indirectly, and whether permanently or temporarily.

Although the embodiments herein may be described in connection with various principles and beliefs, the described embodiments should not be bound by theory. For example, embodiments are described herein in connection with hard disk drives. However, embodiments within the scope of this disclosure can be applied toward other applications.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. An apparatus comprising:

an E-block including a body portion and one or more arms extending from the body portion, wherein at least one of (1) the body portion, or (2) at least one of the one or more arms, comprises a magnesium-lithium alloy material, the magnesium-lithium alloy material comprising a plurality of constituents, each in an amount defined by a constituent weight %, including an amount of the magnesium defined by a first weight % and an amount of the lithium defined by a second weight %, and wherein the first weight % of the magnesium is a greatest constituent weight %, and the second weight % of lithium is a second-greatest constituent weight %.

2. The apparatus of claim 1, wherein the plurality of constituents includes an amount of aluminum defined by a third weight %, and wherein the third weight % of aluminum is a third-greatest constituent weight %.

3. The apparatus of claim 2, wherein the plurality of constituents includes an amount of zinc defined by a fourth weight %, and wherein the fourth weight % of zinc is a fourth-greatest constituent weight %.

4. The apparatus of claim 3, wherein the magnesium-lithium alloy material includes a second weight % of lithium equal to or between 7.5 and 11.5 weight %, a third weight % of aluminum equal to or between 1.5 and 4.5 weight %, and a fourth weight % of zinc equal to or between 0.5 and 4.0%.

5. The apparatus of claim 1, wherein the magnesium-lithium alloy comprises one of LAZ931 or LAZ933 or LA141 or LZ91.

6. The apparatus of claim 1, wherein the body portion and the at least one or more arms are integrally formed.

7. The apparatus of claim 1, wherein the E-block includes a shelf, and wherein the shelf comprises the magnesium-lithium alloy.

8. The apparatus of claim 7, including a coil on the shelf, and wherein a number of turns of the coil is between 100 and 300.

9. The apparatus of claim 8, wherein the apparatus comprises a hard disk drive including a voice coil motor, and wherein the voice coil motor includes one or more magnets positioned above or below the shelf by a distance less than or equal to 0.1 mm.

10. The apparatus of claim 1, wherein an overall density of the E-block is less than 1.55 $g/cm^3$.

11. The apparatus of claim 1, wherein the E-block is free of dampers attached to the body and any of the one or more arms.

12. An apparatus comprising:

an E-block including a body portion and a plurality of arms extending from the body portion, wherein the body portion and the plurality of arms are integrally formed and comprise a magnesium-lithium alloy material; and wherein the magnesium-lithium alloy material comprises a plurality of constituents, each in an amount defined by a constituent weight %, including an amount of the magnesium defined by a first weight %, an amount of the lithium defined by a second weight %, and an amount of aluminum defined by a third weight %, and wherein the first weight % of the magnesium is a greatest constituent weight %, the second weight % of lithium is less than the first weight % and is a second-greatest constituent weight %, and the third weight % of aluminum is less than the second weight % and is a third-greatest constituent weight %.

13. The apparatus of claim 12, wherein the magnesium-lithium alloy material includes a second weight % of lithium between 7.5 and 11.5 weight %, and a third weight % of aluminum between 1.5 and 4.5 weight %.

14. The apparatus of claim 12, wherein the E-block is free of dampers attached to the body and any of the plurality of arms.

15. The apparatus of claim 12, wherein the magnesium-lithium alloy comprises one of LAZ931 or LAZ933 or LA141 or LZ91.

16. The apparatus of claim 12, wherein the E-block includes a shelf, and wherein the shelf is integrally formed with the body and the plurality of arms and comprises the magnesium-lithium alloy.

17. The apparatus of claim 16, including a coil on the shelf, and wherein a number of turns of the coils is between 100 and 300.

18. The apparatus of claim 17, wherein the apparatus comprises a hard disk drive including a voice coil motor, and wherein the voice coil motor includes at least one magnet positioned above or below the shelf by a distance less than or equal to 0.1 mm.

19. The apparatus of claim 12, wherein an overall density of the E-block is less than 1.55 $g/cm^3$.

20. An apparatus comprising:

an E-block including a body portion and one or more arms extending from the body portion, wherein at least one of (1) the body portion, or (2) at least one of the one or more arms, comprises a magnesium-lithium alloy material, the magnesium-lithium alloy comprises one of LAZ931 or LAZ933 or LA141 or LZ91.

* * * * *